Feb. 19, 1946.  G. T. SMILEY  2,395,200
CARTRIDGE CUTTING AND TRIMMING DEVICE
Filed Feb. 26, 1945
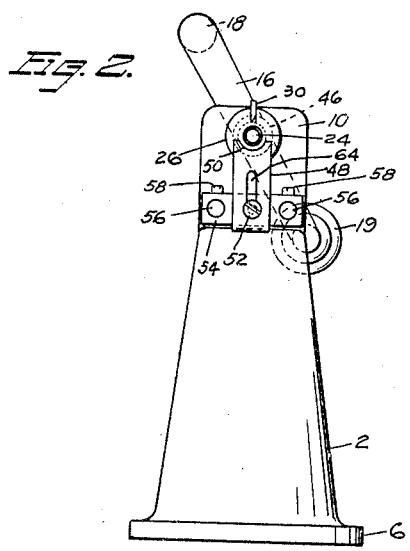
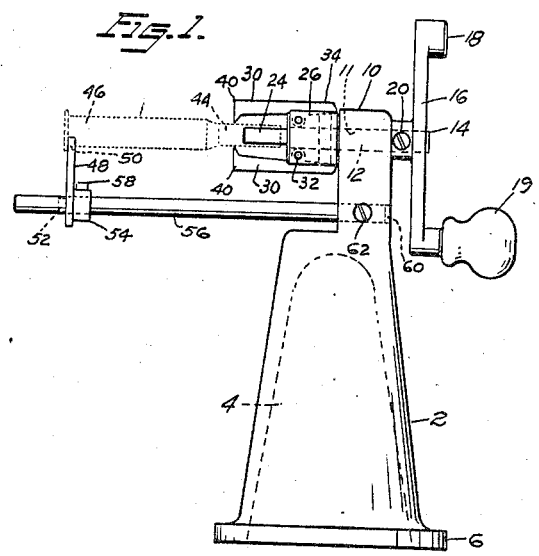
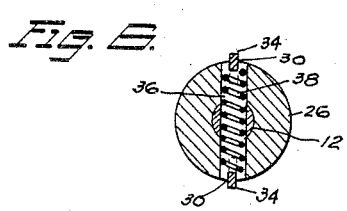
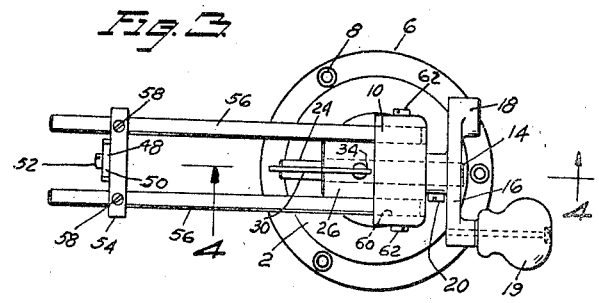
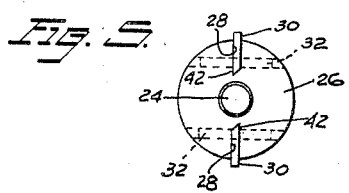
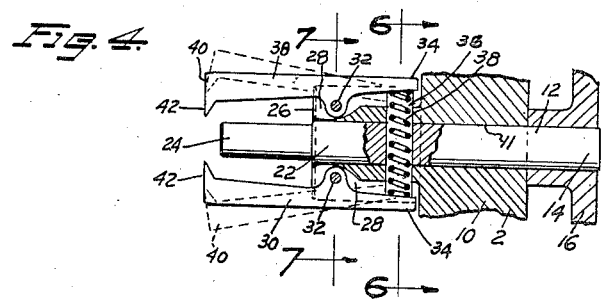
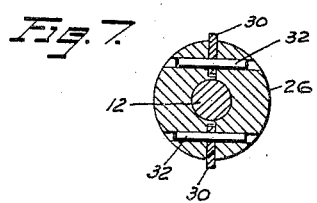
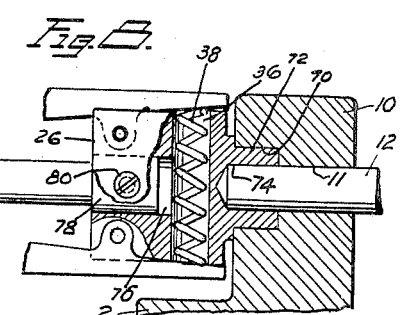
INVENTOR
Gerald T. Smiley Patented Feb. 19, 1946

2,395,200

UNITED STATES PATENT OFFICE 2,395,200

CARTRIDGE CUTTING AND TRIMMING DEVICE

Gerald T. Smiley, San Fernando, Calif.

Application February 26, 1945, Serial No. 579,712

7 Claims. (Cl. 164—60)

My invention relates to cartridge case trimming devices and more particularly to such tools and apparatus which are employed for trimming any size or caliber cartridge case to a proper size and length, smoothly, uniformly and accurately, and thereby eliminating a great deal of hand work which is very slow, unsatisfactory and in many instances very dangerous, because of the rough edges formed at the cartridge neck section during the hand cutting operation.

Accordingly an object of my invention is to provide a suitable cartridge trimming tool, which is simple in construction, readily adapted for use, and when in operation for providing a uniform and smooth cartridge case and in addition to provide a finished article in readiness for loading.

Manifestly, an object of my invention is to provide a cartridge case cut-off and trimming tool, which may be used in place of the present method employed, wherein a hack-saw or a circular saw blade is used, causing the neck to become ragged, particularly when a re-sized cartridge case is trimmed, requiring, in many instances, to remove ¼ to ¾ inch in length, such hand operation requiring a great deal of handling and filing, which is very unsatisfactory, to the end that when loaded and the ammunition is used, its firing, performance and other ballistic qualities are greatly impaired.

My invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combination and arrangements of parts, which will more fully appear in the course of the following description. However, the drawing merely shows and the following description merely describes the embodiments of the present invention, which are given by way of illustration or example only.

Reference is had to the accompanying drawing, in which the similar reference characters, denote the same parts.

In the drawing:

Fig. 1 shows a side elevational view of the cartridge case neck trimming and cutting-off device, showing a cartridge in place.

Fig. 2 is a front elevational view of the device, taken from the left of Fig. 1.

Fig. 3 shows a top plan view of the device, taken from the top of Fig. 1.

Fig. 4 shows a fragmentary and enlarged side sectional view of the trimming device, taken on the line 4—4 of Fig. 3.

Fig. 5 shows a vertical end view, taken from the front end of Fig. 4.

Fig. 6 is a vertical sectional view, taken on the line 6—6 of Fig. 4.

Fig. 7 is another vertical sectional view, taken on the line 7—7 of Fig. 4.

Fig. 8 shows a fragmentary sectional and enlarged view of the trimming device, taken in similar position as shown in Fig. 4, and showing same in its modified form.

Describing my invention more in detail, in its broader aspects, said invention comprises a base 2 which is provided with a cored-out section 4, having a mounting flange member 6 provided with a set of screw sockets 8, so that it may be mounted and held rigidly in a position, when in use.

The upper section of said base 2 is provided with a suitable brace member 10, having a shaft bearing 11 adapted for receiving therein a shaft 12, which is rotatably mounted therein.

Said shaft 12 has its end 14 extended rearwardly the end of which is provided with a suitable handle 16, said handle having a balance member 18 at one of its ends, while the other end thereof is provided with a knob 19. Said handle is held in place at the center hub and upon the end of said shaft by means of a fastening screw 20.

The front end 22 of said shaft 12 extends through said brace 10, the outer-most end of which terminates with a pilot member 24, with which to hold and centralize the position of a cartridge when in position.

Said shaft end 22 is also provided with a cutter head 26, which comprises a cylindrical body, having a set of longitudinally disposed slots 28, wherein a set of cutter blades 30 are positioned, and which are held in position by means of pivot pins 32, thus allowing said blades 30 to pivot thereon when in operation.

The rear extensions 34 of said blades 30 are disposed over a suitable socket or hole 36 wherein a spring 38 is placed, the expansion of which causes said extensions 34 to spread outwardly, as shown in Fig. 4.

The spreading of said extensions 34 causes the cutter ends 40 with the cutting edges or blades 42 to bear against the cartridge neck member 44, while the cartridge base member 46 is held in position by means of an adjustable plate member 48.

Said adjustable plate 48 is provided with a suitable saddle member 50, also having a screw slot for holding said plate 48 in an adjustable position by means of a screw member 52 upon a cross bar 54, which is slidably and adjustably mounted upon a pair of rod extensions or supports 56.

Said cross bar 54 is held in position by means of holding screws 58 at the extended end of said supports 56, while the other ends of said supports 56 are mounted in suitable bearings 60 wherein same are held in place by means of screws 62.

In order to trim the cartridge neck 44 to a desired length, the cartridge base 46 is placed within said saddle 50, the position of which is set by means of said cross bar 54 to a proper distance, while the height, or the horizontal position of said cartridge, in relation to the pilot 24, is set by means of said adjustable plate 48, which adjustment is accomplished by means of raising or lowering said plate 48 and then fastening it in place by the screw 52 disposed over the slotted hole 64.

By pressing the rear extensions 34 of said cutter blades 30 and by compressing the spring 38, said cutting points 42 are raised, thus allowing said cartridge to be placed in a position, as shown in Fig. 2, whereupon by releasing said cutter blades 30 and by holding lightly said cartridge, in order to prevent it from turning, said cutter head 26 together with said cutter blades 30 may be turned about its axis by means of said handle 16, then said spring 38 will cause the cutting points 42 to bear upon and will cut the cartridge neck 44 smoothly and accurately.

When it is found necessary to provide a larger or smaller pilot member 24, for a cartridge of different caliber, said pilot 24 is removed and may be changed to suit, as shown in Fig. 8, and to that end, the cutter head 26 is provided with a suitable boss 70 forming a head shank 72 which is held in place by means of pressing it upon the shaft end and into the boss socket 74, or by other means such as set screws, pins or the like.

Also, the front end of said cutter head 26 is provided with a suitable pilot socket 76 wherein the detachable pilot member 78 is placed and which is held in place and position by means of a screw 80.

In this manner the changes to suit any special or desirable condition may be made quickly and effectively, allowing to have a wider scope of usefulness for the device herein shown and described.

While I have thus described my invention with great particularity, it will be clear that the same may be modified throughout a wide range.

I accordingly do not propose to be limited to the exact details of construction herein shown on the drawing and described in the specification, but reserve the rights in practice to make the necessary changes and modifications therein, which may come within the scope of the appended claims.

I claim as my invention:

1. In a cartridge cutting and trimming device of the class described, a base, a brace member extending upwardly from said base, a rotatable shaft in said brace, disposed transversely therein and having its ends extending frontwardly and rearwardly therefrom, a handle member mounted upon said rearwardly extending shaft end, a cutter head member mounted upon the frontwardly extending shaft end, a cartridge pilot member extending out of said frontwardly extending shaft end and disposed at the inside of the front end of the cartridge for holding a cartridge neck in a central position, a pair of support rods extending frontwardly from said brace, a cross bar adjustably mounted upon said pair of support rods, an adjustable plate means mounted upon said cross bar for holding a cartridge in a cutting and trimming position and in relation to said pilot member, and cutting means in said cutter head member for cutting and for trimming the neck of said cartridge when turning said handle.

2. In a cartridge cutting and trimming device of the class described having a pilot end disposed at the inside of the front end of the cartridge and having a cutter head mounted upon a revoluble shaft which is mounted upon a base, a pair of longitudinal slots in said cutter head, a spring in said head disposed transversely therein, a pair of pivotal cutter blades in said longitudinal slots, pivot pins in said cutter head for holding said cutter blades in pivotal position, cutting edges disposed at the front end of said pivotal cutter blades, and means extending out of said cutter blades for engaging said spring for forcing said cutting edges downwardly and upon the cartridge neck and thereby cutting and trimming said neck when revolving said cutter head upon the shaft.

3. In a cartridge cutting and trimming tool of the class described comprising, a base, a cutter head revolubly mounted in said base, a pilot means in said cutter head and disposed in the inside of the front end of the cartridge for holding the neck of a cartridge in place, and extendible means mounted in said base for holding the cartridge in position and in relation to the position of said pilot means.

4. In a cartridge cutting and trimming tool of the class described comprising a base, a cutter head means revolubly mounted in said base, a pilot means in said cutter head means having its end disposed in the inside of the front end of the cartridge for holding the neck of a cartridge in place, and extendible rods mounted in said base extending frontwardly from said cutter head means, an adjustable means mounted on said extendible rods for adjusting and for holding a cartridge in position during the neck cutting and trimming operation.

5. In a cartridge neck cutting and trimming tool of the class described comprising a base, a cutter head revolubly mounted in said base, a pilot in said cutter head and disposed in the inside of the front end of the cartridge for holding the neck of a cartridge in position, a set of cutters in said cutter head, a pair of supports in said base extending frontwardly therefrom, an adjustable cross bar means slidably mounted on said supports for supporting said cartridge in relation to said pilot, and means in said cutter head for forcing said cutters into a cutting position.

6. In a cartridge neck cutting and trimming tool of the class described as described in claim 5 wherein a handle member is connected to said revolubly mounted cutter head for turning said cutter head with said cutters about its axis.

7. In a cartridge neck cutting and trimming tool as described in claim 5 wherein a removable pilot is provided, and means in said cutter head for holding said pilot in position.

GERALD T. SMILEY.